United States Patent [19]

Trotta

[11] Patent Number: 5,218,348
[45] Date of Patent: Jun. 8, 1993

[54] VERSATILE ASSEMBLY FOR HOUSING AN INTERACTIVE COMPUTER

[75] Inventor: Frank A. Trotta, Maplewood, N.J.

[73] Assignee: Intermark Corp., New York, N.Y.

[21] Appl. No.: 900,531

[22] Filed: Jun. 18, 1992

Related U.S. Application Data

[63] Continuation of Ser. No. 427,617, Oct. 26, 1989, abandoned.

[51] Int. Cl.⁵ .............................................. G09G 3/02
[52] U.S. Cl. ..................................... 340/711; 340/700
[58] Field of Search ................. 248/917, 918, 219.1, 248/231.7; 340/700, 711, 712; 361/384, 391, 390, 393-398, 400, 356; 364/708; 269/95, 91, 101, 249, 903; 273/148 B; 40/573, 572, 574; 362/365, 370, 371, 396; 60/602

[56] References Cited

U.S. PATENT DOCUMENTS

| | | |
|---|---|---|
| 359,833 | 3/1887 | Basinger. |
| 378,572 | 2/1888 | Carroll et al. |
| 2,368,843 | 2/1945 | Kees. |
| 2,591,337 | 4/1952 | Cohen et al. .............. 248/231.7 |
| 2,895,087 | 7/1959 | Lieb et al. .................. 361/390 |
| 2,920,665 | 1/1960 | Hutson. |
| 2,949,140 | 8/1960 | Larson. |
| 2,990,639 | 7/1961 | Van Gieson. |
| 3,036,394 | 5/1962 | Johnstone. |
| 3,147,003 | 9/1964 | Johnson. |
| 3,349,289 | 10/1967 | Mueller ..................... 361/394 |
| 3,744,645 | 7/1973 | Hochman ............... 248/231.7 X |
| 3,883,128 | 5/1975 | Breese ........................ 269/101 |
| 4,083,624 | 4/1978 | Timmer. |
| 4,138,711 | 2/1979 | Bremenour et al. ........ 361/399 |
| 4,291,475 | 9/1981 | Schoemer. |
| 4,296,454 | 10/1981 | Wong. |
| 4,333,155 | 6/1982 | Johnston ................... 364/708 |
| 4,468,718 | 8/1984 | Main ......................... 361/394 |
| 4,503,484 | 3/1985 | Moxon ...................... 361/394 |
| 4,521,021 | 6/1985 | Dixon ....................... 273/148 B |
| 4,545,023 | 10/1985 | Mizzi ........................ 340/712 |
| 4,548,377 | 10/1985 | Huel ......................... 248/219.1 |
| 4,652,969 | 3/1987 | Stegenga ................... 361/384 |
| 4,672,519 | 6/1987 | Castner ..................... 364/708 |
| 4,703,160 | 10/1987 | Narishima et al. ......... 364/708 |
| 4,789,774 | 12/1988 | Koch et al. ............... 361/390 X |
| 4,807,947 | 2/1989 | Nuzzo. |
| 4,827,504 | 5/1989 | Collins et al. ............. 361/356 |
| 4,832,299 | 5/1989 | Gorton et al. ............. 248/231.7 |
| 4,844,397 | 7/1989 | Skakoon et al. .......... 269/249 X |
| 4,853,838 | 8/1989 | Westermann .............. 361/391 |
| 4,937,563 | 6/1990 | Shekita et al. ............ 340/700 |
| 4,999,758 | 3/1991 | Wimberly .................. 362/396 X |

FOREIGN PATENT DOCUMENTS 8022034 11/1980 Fed. Rep. of Germany.
8803327 5/1988 Fed. Rep. of Germany.

OTHER PUBLICATIONS

Marketing & Media, May 1987, by Fhyllis Fine.
Footwear News, Jun. 20, 1988, by Eve Tahmincioglu.
New York Magazine, Jan. 16, 1989, by Bernice Kanner.
Fortune, May 25, 1987, by Faye Rice.

*Primary Examiner*—Ulysses Weldon
*Attorney, Agent, or Firm*—Hedman, Gibson & Costigan

[57] ABSTRACT

An assembly for housing an interactive computer which can be used for a variety of marketing functions. This assembly is designed to house a variety of electronic components which can be easily changed according to the changing marketing demands of the vendor.

21 Claims, 6 Drawing Sheets

VERSATILE ASSEMBLY FOR HOUSING AN INTERACTIVE COMPUTER

This is a continuation of U.S. application Ser. No. 07/427,617 filed Oct. 26, 1989, which is now abandoned.

FIELD OF INVENTION

This invention relates to an assembly for housing an interactive computer which can be used for a variety of marketing functions. Specifically, this invention relates to an assembly designed to house a wide variety of electronic components for an interactive computer designed as a sales tool. These components, comprising an input, a display, and programmable electronics can be housed within this assembly and changed according to the changing marketing demands of the vendor. In particular, this assembly is designed to be adaptable for a wide variety of merchandise and incorporated into a wide variety of marketing displays. More particularly, the assembly is designed so that the components can be easily individually replaced. The assembly further includes a clamp for affixing the assembly to the merchandise or marketing displays with a feature for avoiding pilferage.

DESCRIPTION OF THE PRIOR ART

Marketing studies have determined that seventy five percent of buying decisions are made at the point of purchase. In order to capitalize on this consumer proclivity, and to reduce labor costs, many producers and product vendors have incorporated interactive computer services to sell their products. Such services function as informational systems which educate customers with respect to the particular products on display. These systems are specifically tailored to each individual product. Through a series of questions concerning a customer's needs, and life styles to which each customer responds, the computer recommends the particular style, model number, etc. of the product that would be most applicable to each individual's requirements. Additionally, these computers may compile a cross-section of prospective customers and the interests of the customers by recording their inputs.

For example, Clarion TM has introduced an interactive computer to assist in selecting the proper shade of make-up for a woman, depending upon her particular skin characteristics. Using the computer, which works essentially like a cash machine, women push buttons to answer questions about their skin, hair and eye color, and are then given a shopping list of the best shades. By answering the questions posed by the computer, each woman can select her particular shade. In this way, they get personalized sales help in a shopping environment where a salesperson may not be available. This sales technique has resulted in one of the most successful cosmetic marketing technique in years.

Similarly, car manufacturers have begun using interactive computer assemblies to match the multitude of their models and accessories with each individual purchaser. These have also been extremely successful in assisting the consumer to narrow the field of his search in order to more accurately select the proper vehicle for his particular requirements. Not coincidentally, this has also enabled manufacturers to increase the efficiency of their sales forces because the computer has narrowed the consumers breadth of questions.

As more and more manufacturers, producers, and retailers utilize this new sales tool, the need for an interactive computer assembly which is flexible enough to meet a variety of demands increases. Flexibility will be required not only in aesthetically complementing the sales presentation of each retailer, but flexibility in housing a variety of computer displays, messages, and the ability to change messages without requiring an entirely new assembly.

In terms of a changeable computer display, U.S. Pat. No. 2,990,639 of Van Gieson generally discloses a telephone number index overlay interlocked into position. U.S. Pat. No. 3,036,394 of Johnstone discloses record cards held by tabs with the tabs secured to the mounting board. Further, U.S. Pat. No. 4,291,475 of Schomer discloses a flexible transparent shield which covers a paper label with a pair of notches disposed in tangs in the transparent shield. The notches wrap around posts in the housing to retain the transparent shield.

These disclosures are the extent of the flexibility of computer assemblies to house different input, display, and programmable electronics.

Presently, elaborate in-store interactive computer assemblies are individually designed for each particular product or manufacturer. Consequently, the assemblies are devoid of any flexibility in changing their displays and interactive programs, or in being able to be incorporated in another manufacturer's marketing display. Once the sales message and the logic has been programmed, it is not easily changed. Further, because they were aesthetically designed for a particular product line, they could not be used in another product line or by another manufacturer. In addition, because each computer assembly is specifically designed for incorporation into its product line, the tooling and design costs are quite high. No in-store interactive computer assembly could be used across product lines, by different types of manufacturers and with easily changeable logic packages.

Many different types of clamps and brackets are produced for attaching objects to one another. The present invention employs a steel band which has a concave mid portion and two end portions. One of the end portions has a hole through which a post is threaded. At the end of this post a plate is fastened by means of a swivel. On the post, between the clamp end and the plate, a collar is secured to which a set screw is attached. The set screw variably adjusts and locks the height of the post.

Although collars, set screws, and bracket clamps are freely used, none of the prior art functions is the manner employed by the present invention. For example, in U.S. Pat. No. 359,833, BASINGER discloses a set screw in a frame of a C-clamp to hold the screw against movement. There are fixed, discrete positions into which the set screw fixes. On the other hand, in the clamp of the present invention the set screw can be positioned along the entire length of the post. Additionally, BASINGER utilizes a thumb screw, and not the tamper proof hex nut driven set screw of the present invention.

In U.S. Pat. No. 378,572, CARROLL ET AL disclose a collar with a screw therethrough to prevent movement of a screw. The collar abuts a biased end of the C-clamp for fast action and works in an entirely different manner than the clamp of the Applicant. In U.S. Pat. No. 2,368,843, KEES discloses a collar with a set screw therethrough to prevent movement of a pressure bar of a C-clamp. However, the collar is attached to a sleeve with a bore through which a post of the clamp slides. Applicants' collar is directly attached to the post without need for the sleeve.

In U.S. Pat. No. 2,920,665, HUTSON discloses a collar with a set screw used on a clamp. However, the clamp utilizes a double threaded post with graduations for both the post and the collar. This clamp also is not for fixing a removably article to a fixed article. Instead, it has a selectively yieldable means. Other attachment hardware allows anchoring to slat wall, peg wall, and various display fixture configurations.

In U.S. Pat. No. 2,949,140, LARSON uses only a nut or collar to secure the screw of the clamp. There is nothing in this disclosure providing the teaching of a tamper resistant set screw. U.S. Pat. No. 3,147,003 of JOHNSON also uses a nut on the C-clamp screw, but this too is devoid of any teaching to provide a tamper resistant set screw. U.S. Pat. No. 4,083,624 of TIMMER discloses set screws used with a C-clamp. A bore is coaxial with a moveable clamping rod. This device also does not show the tamper resistant set screw of the present invention. In fact, none of the prior art designs utilize a steel band with a concave mid portion mating with a convex outer portion of an article to be secured thereto.

SUMMARY OF THE INVENTION

It is therefore an object of the invention to provide an assembly for an interactive computer display wherein the assembly has an openable chamber and is adapted to house, on mounts, electronic components which can each be easily changed and replaced according to the demands of the vendor.

It is another object of this invention to provide a single assembly capable of being incorporated into a variety of manufacturers merchandising and marketing displays.

It is still another object of this invention to provide a single assembly capable of housing different types of input, display, and programmable electronics.

It is a further object of the invention to provide a mounting bracket to affix the assembly to a marketing display.

The assembly of the present invention is specifically designed for versatility in interactive computer displays. It is adapted to house a variety of manufacturers electronic components. It is also designed so that these components can be easily replaced individually according to the changing demands of the vendor. It is further designed to be aesthetically incorporated into a wide variety of marketing presentations and merchandize displays. Furthermore, the clamp affords an innovative method of attaching the assembly to the merchandize display. A convex outer portion of the assembly mates with a concave bend in the clamp for securing the assembly to a fixed article.

As will be appreciated by those skilled in the art, a major advantage provided by the present invention is that this assembly is not solely dedicated to a specific or particular product line but can be used by a wide variety of users in many different types of merchandize displays. It can further house a wide variety of electronic components. Because each electronic component can be easily individually replaced, flexibility is provided and economies of scale heretofore unrealized result.

The assembly of the present invention will be better understood by reference to the following detailed discussion of specific embodiments and the attached figures which illustrate and exemplify such embodiments. It is understood however, that such a diagrammatic representation of the present invention is not intended to restrict the present invention, since many more modifications may be made within the scope of the claims without departing from the spirit thereof.

BRIEF DESCRIPTIONS OF THE DRAWINGS

A specific embodiment of the invention will be described with reference to the following drawings wherein.

DESCRIPTION OF THE PREFERRED EMBODIMENT

Figure 1:
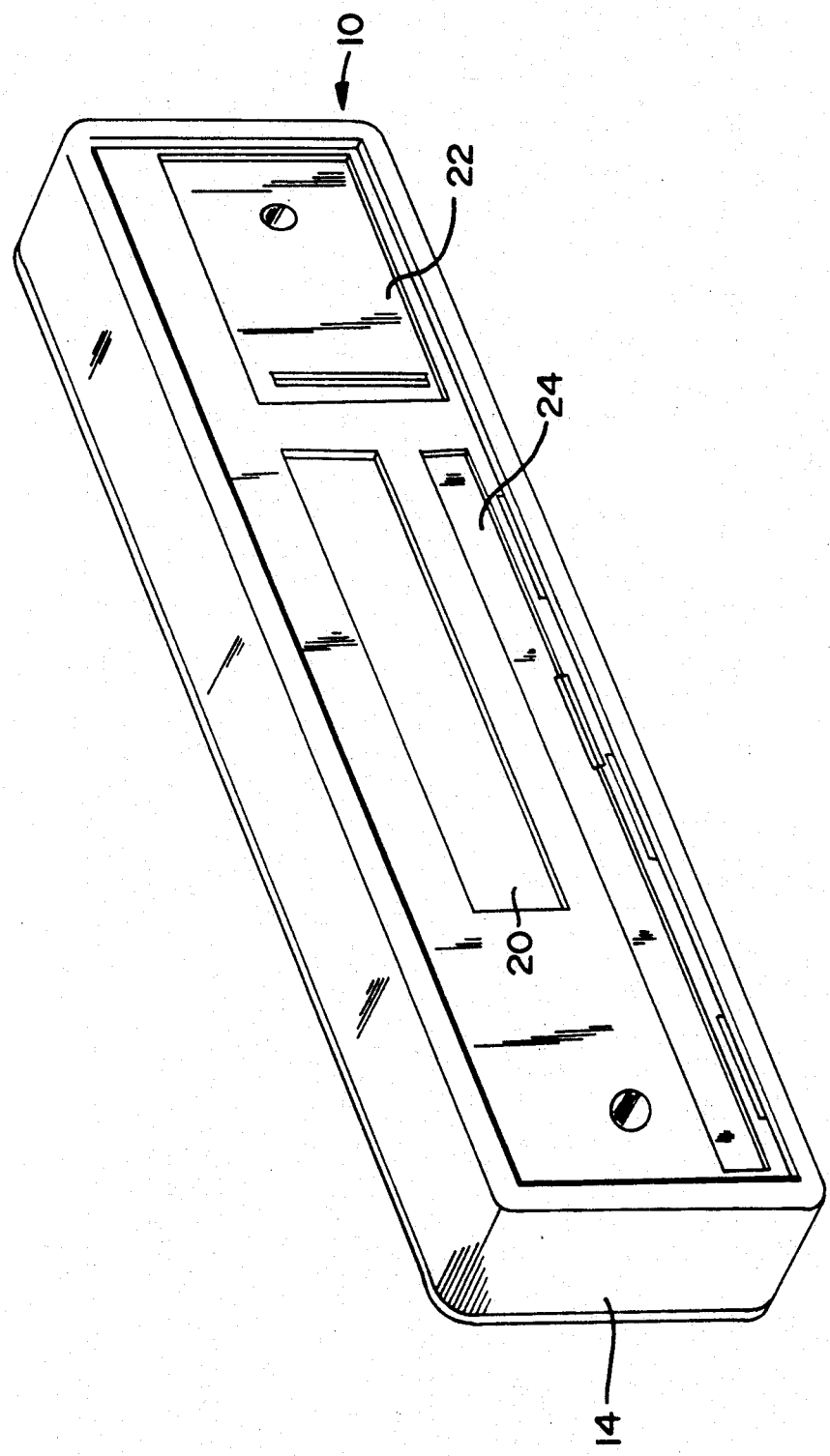
FIG. 1 is an orthogonal depiction of the assembly of the present invention in a closed position.
Figure 8:
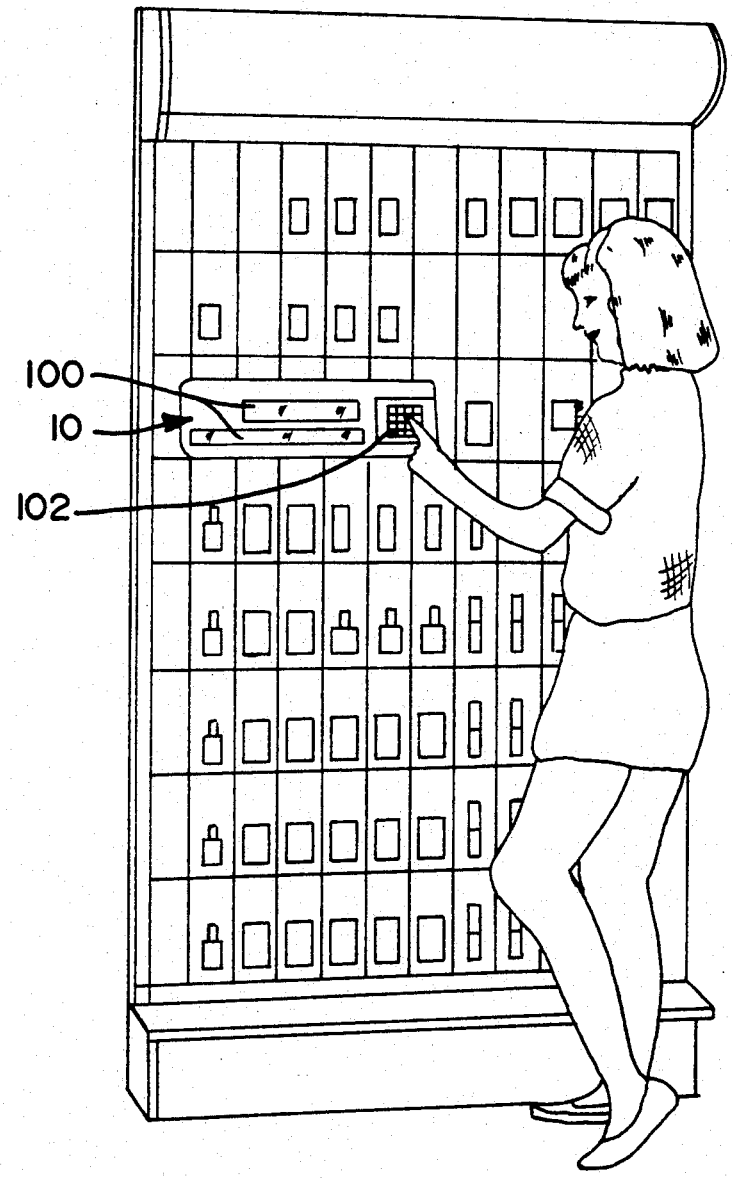
FIG. 8 is a representation of the assembly of the present invention in a marketing display.

The present invention is directed to an assembly having an openable chamber for housing electronic components used in an interactive computer. Referring initially to the form shown in FIGS. 1 and 2, the preferred embodiment of the present invention comprises an assembly (10) having an openable chamber (12) of at least two portions, a front portion (14) and a rear portion (16). A means for opening the assembly is included and can be in the form of a piano type hinge (18) running the length of the assembly (10). The front portion (14) of the assembly has at least one opening (20) for the electronic components. For example, the opening (20) depicted in FIG. 1 allows an electronic display (100) to be viewed by a user as shown in FIG. 8. The front portion (14), having a substantially rectangular longitudinal cross section also has a recessed portion (22) for housing an electronic board for input (102). Other recessed portions or openings (24) can also be provided for other graphic displays in the front portion of the assembly.

Figure 2:
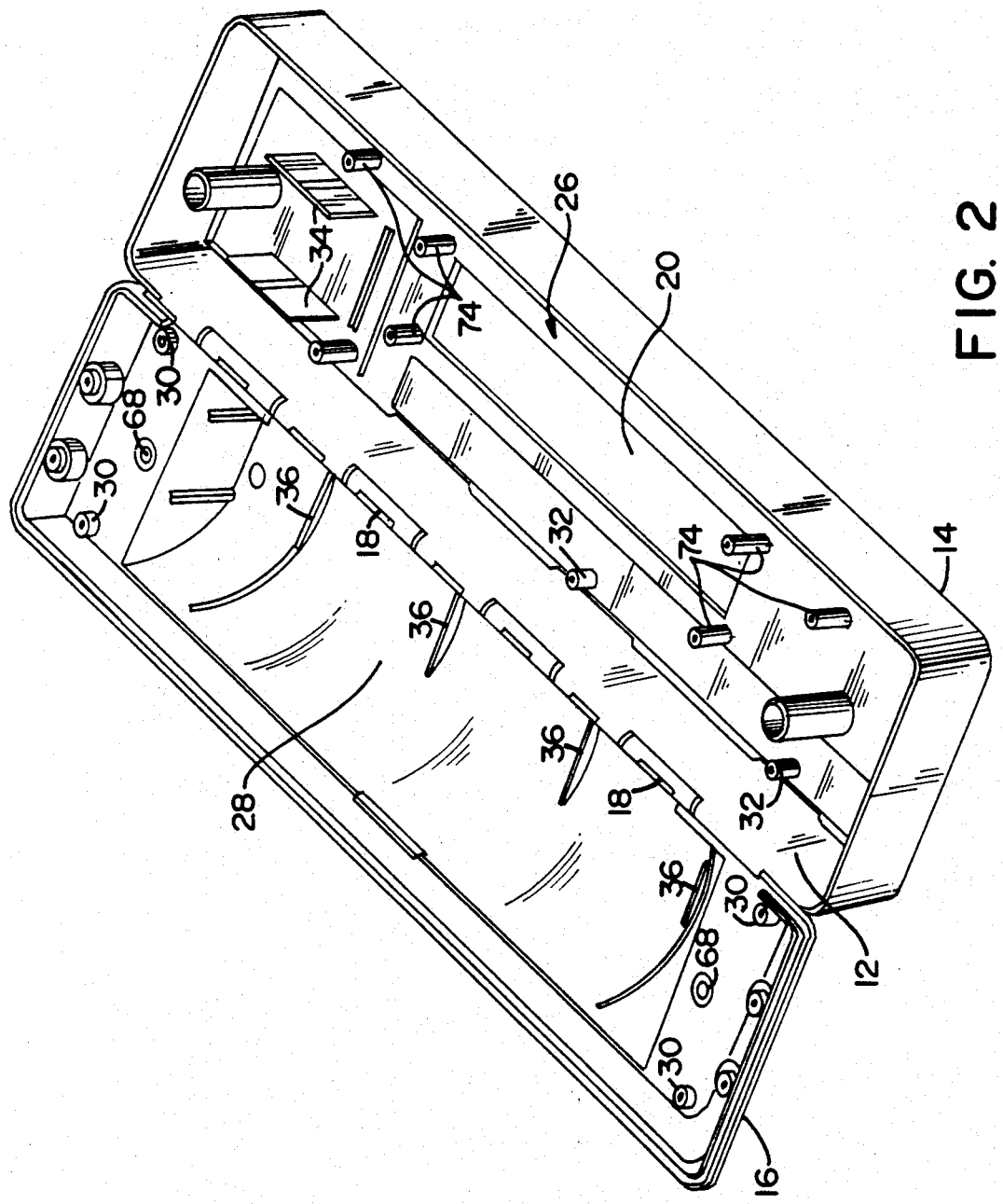
FIG. 2 is an orthogonal depiction of the assembly of the present invention in an open position exposing the mounts for the electronic components.
Figure 5A:
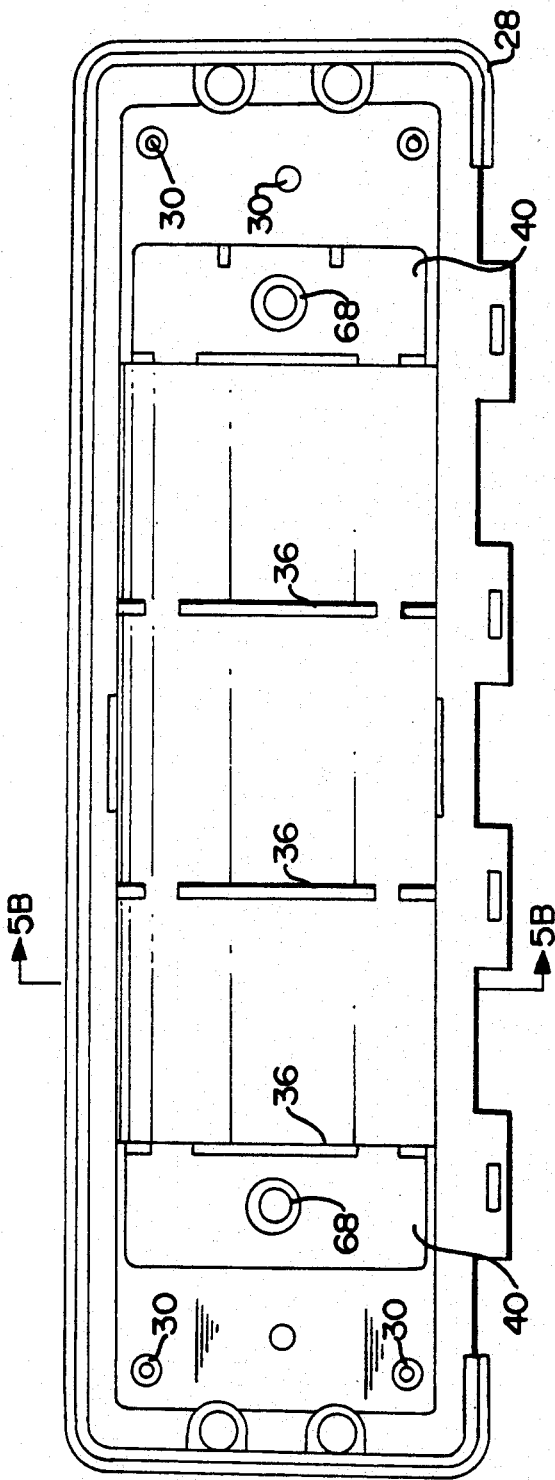
FIG. 5A is a view of the interior of the rear portion of the assembly.
Figure 5B:
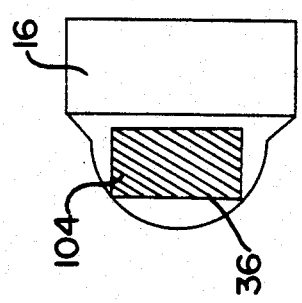
FIG. 5B is a sectional view of the interior of the rear assembly.

FIG. 2, further shows the assembly in the open position revealing the chamber (12) defined by a cavity (26) formed in the front portion (14) and a mating cavity (28) formed in the rear portion (16). Within the chamber (12) on the inside of the front portion cavity (26) and on the inside of the rear portion cavity (28) also shown in FIG. 5A, are a plurality of mounts (30) for affixing a wide variety of components. For example, as shown in FIG. 5B, ribs (36) position a battery (104) in the rear portion of the assembly. The mounts (30) can be either formed integral with the front and rear portions or can be individually placed according to the mounting requirements of the electronic components. However, the hallmark of this assembly is its ability to house and easily replace a wide variety of electronic components. This is accomplished by a strategic array of the mounts in a spaced relationship to the opening. The mounts depicted in FIG. 2 are formed integrally with the front and rear portions and comprise mounts (32) for affixing the circuit board to the assembly, guide walls (34) for affixing the keypad (102) to the assembly and which plugs into a socket of the circuit board, and ribs (36) for affixing the battery (104) to the assembly, and mounts (74) for affixing the display (100) to the assembly.

The assembly can be constructed of extruded or molded plastic, sheet metal, or any other material suitable for housing electronic components. Preferably, ABS 0.001 inches thick is used for the assembly. In order to properly house the components and aesthetically fit into the marketing display, the assembly should be free of skin marks, weld lines and surface blemishes. The flashing on the assembly should not exceed 0.005 per cent and the warp should not exceed 0.5% of its length.

The mounts used for the electronic components (30) depend upon the particular display manufacturer. The assembly is adaptable for a variety of combinations of manufacturers. The following table refers to the mounts (standoffs) applicable to different manufacturers of displays.

| MANUFACTURER | TYPE | STANDOFF POSITION | STANDOFF HEIGHT |
| --- | --- | --- | --- |
| HANOK | 4 × 40 | A | 0.268 |
| SAYNO | 4 × 40 | A | 0.312 |
| SEIKO | 4 × 40 | B | 0.162 |
| OPTREX | 4 × 40 | B | 0.218 |
| OPTREX | 2 × 40 | C | 0.218 |
| SEIKO | 2 × 40 | C | 0.202 |
| SAYNO | 2 × 40 | C | 0.196 |
| HANDOK | 2 × 40 | C | 0.190 |

Figure 3:
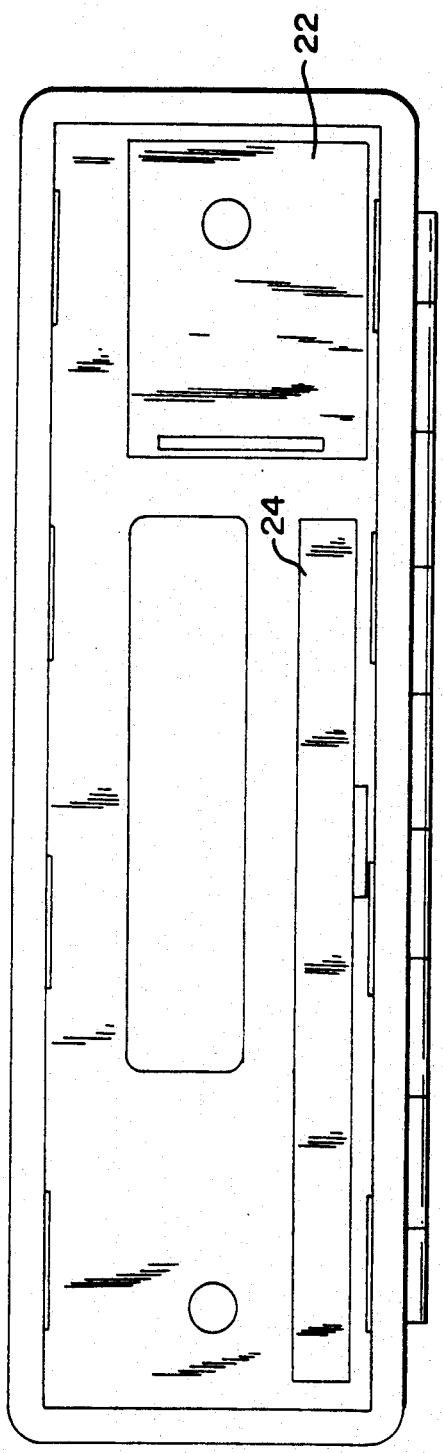
FIG. 3 is a front view of the assembly.

The front of the assembly, as shown in FIG. 3, has spaces provided for the input (22) and for displays (20) and (24). The opening (20) for the display when a Seiko 4×40 display is used is 5×69"×1.08".

Figure 6:
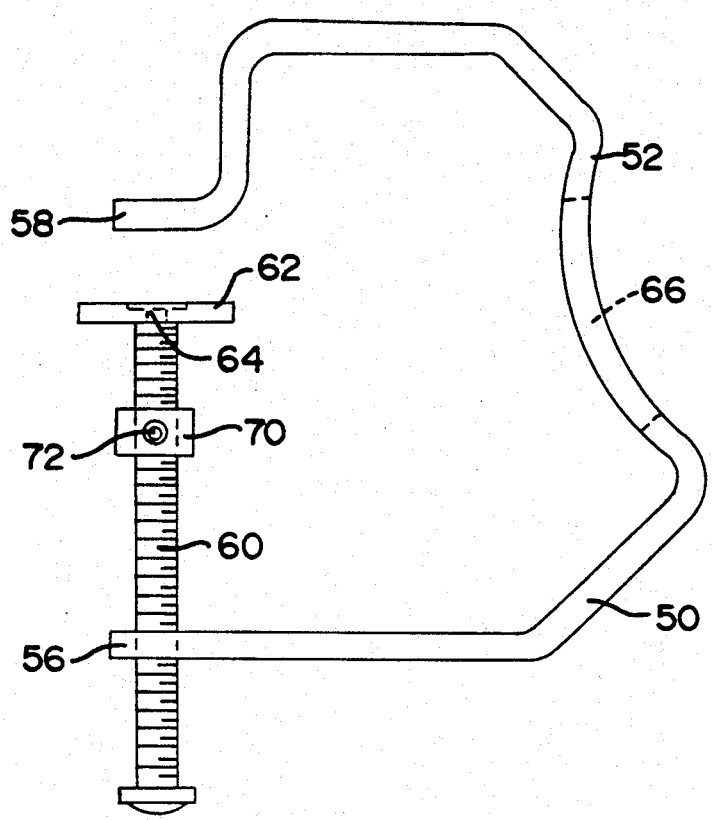
FIG. 6 depicts a side view of a clamp designed to hold the assembly to a fixed article, such as a marketing display.
Figure 7:
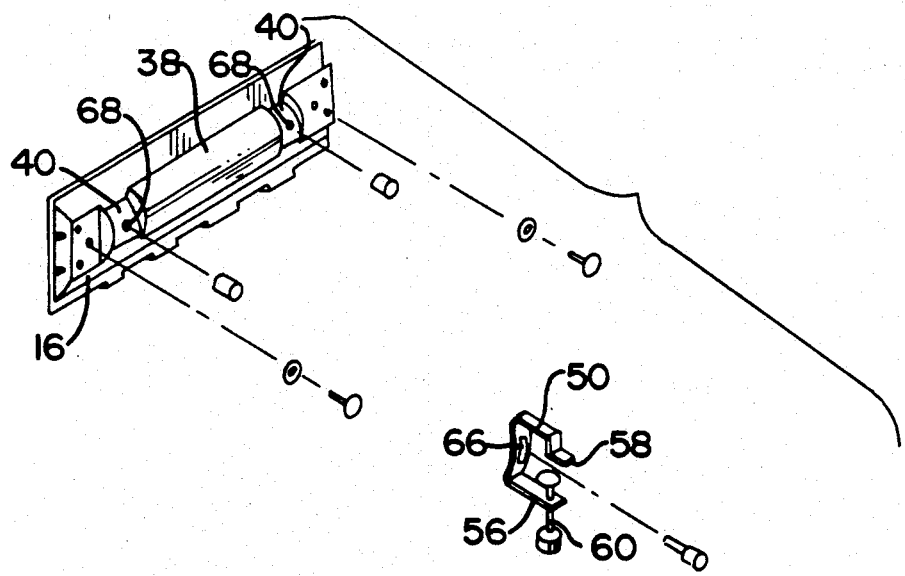
FIG. 7 is an exploded view of the clamp and the rear portion of the assembly.

As shown in FIG. 7, the rear portion (16) of the assembly has a convex outer shape (38). This convex shape (38) is designed to mate with the concavity (52) of the clamp (50) illustrated in FIG. 6. The convex shape (38) additionally has two recessed channels (40) for securing the assembly (10) into the concavity (52) of the clamp (50). These channels (40) prohibit bracket rotation about its mounting bolt. As further illustrated in FIG. 6, the clamp (50) has a slot through which an attachment means fixes the clamp to the assembly. The clamp further has two ends (56 and 58) which secure to a fixed article, for example, a merchandize display by means of a post which tightens upon a fixed member of the display and is fixed in place by means of a set screw.

The clamp can be constructed of a resilient material for example, stainless steel, fiber reinforced plastic, or other suitable material for securing the assembly to a fixed structure. Preferably, two 3/16"×1" powder coated steel straps are used. These are attached to the assembly by attachment means through holes (68) depicted in the rear portion (16) of the assembly best seen in FIG. 7. It can also be attached to a fixed display alternatively by mounting screws. Holes for alternatively affixing the assembly to a display stand can be also provided as part of the assembly.

As best seen in FIG. 6, each clamp has a first end (56) and a second end (58). The first end is drilled and tapped, through which a post (60) is threaded The post (60) is preferably 3.0" long×¼" in diameter. The post has a bolt end and a free end. A plate (62) is secured to the free end by means of a swivel (64). A ½" diameter by 5/16" collar (70) is affixed around this post (60) at its free end between the plate and the first end of the clamp. Into this collar slides a 3/16" diameter set screw (72) ⅜" long preferably with hex drive. By utilizing a hex nut driven set screw, pilferage will be greatly reduced. The post as shown in FIG. 7, is then screwed so that a fixed article is squeezed between the plate and the second end of the clamp (58). The post is then locked in place by the set screw (72). The swivel is ⅝"×1" diameter. Rotating the set screw (72) about the post (60) to a position away from the computer face effectively conceals its presence to would be thieves.

Figure 4:
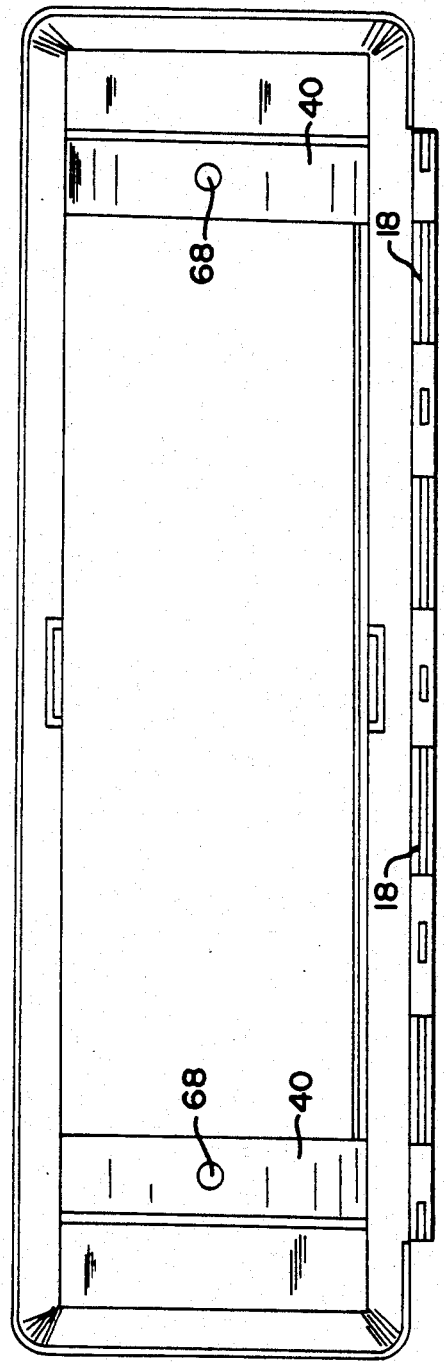
FIG. 4 is a rear view of the assembly.

Between the first and second ends of the clamp is a concave mid-portion (52). The concavity has a radius of about 1.69". Within this concavity is a slot (66). A screw or bolt or other attachment means is fed through this slot (66) into a mating hole (68) shown in FIGS. 4 and 7 in the recessed channels (40) of the convex outer portion of the assembly (38). The slot is typically 5/16" wide and 1" long.

I claim:

1. An assembly for housing an interactive computer having replaceable electronic components, said assembly comprising an openable chamber, having an interior and an exterior, comprising at least two sections attached by hinge means, said sections including a plurality of mounting means comprising terminal posts fixedly attached to the interior of said sections strategically arranged for fastening a wide variety of replaceable electronic components to the interior of said sections on terminal ends of said posts, said assembly further comprising means for opening said chamber and means for accessing input means and output means from the exterior of said assembly, said assembly additionally comprising a mounting bracket consisting of a substantially flat strip having a first end portion, a concave mid portion having a slot therethrough, and a second end portion wherein said first and second end portions are clamped together on a display and said concave mid portion mates with and is attached to a convex rear outer portion of said chamber by means of attachment passing through the slot in the concave mid portion of the mounting bracket engaging a mating hole in the convex rear outer portion of the chamber wherein the means of attachment can be at least partially released and resecured to provide for tiltably mounting the chamber on the mounting bracket while maintaining contact between the convex rear outer portion of the chamber and the concave mid portion of the bracket along the length of the concave mid portion of the bracket.

2. The assembly of claim 1 wherein said wide variety of said electronic components attached to the interior of said sections comprise an electronics board for processing, and an EPROM for memory having socket mounts to said electronics board.

3. The assembly of claim 1 wherein the input means and output means comprise a display for output and a keypad for input.

4. The assembly of claim 5 wherein said display comprises a liquid crystal display.

5. The assembly of claim 3 wherein said display comprises a light emitting diode display.

6. The assembly of claim 3 wherein said chamber further comprises one or more openings for viewing said display.

7. The assembly of claim 3 wherein said chamber further comprises one or more openings for accessing said input means.

8. The assembly of claim 1 wherein said hinge means comprises a piano type hinge.

9. The assembly of claim 1 wherein at least one of said two sections comprise a rectangular front display portion.

10. The assembly of claim 9 wherein at least one of said two sections comprise a rear portion having a substantially convex outer shape, wherein said rear section securely closes upon said front section.

11. The assembly of claim 9 wherein said front display section comprises said openings in said chamber for viewing said output means and for accessing said input means.

12. The assembly of claim 1 wherein said chamber is made of plastic.

13. The assembly of claim 12 wherein said plastic is ABS plastic.

14. The assembly of claim 1 wherein the mounting bracket is adapted for attachment to a merchandising fixture.

15. The assembly of claim 1 wherein said mounting bracket comprises a rigid steel band.

16. The assembly of claim 1 wherein said second end of the mounting bracket includes a threaded hole and said mounting bracket further comprises:
 a) a post having a bolt head end and a free end, said post threaded into said threaded hole of said second end of said mounting bracket;
 b) a plate attached to said free end of said post by means of a swivel; p1 c) a collar threaded around said post between said second end of said bracket and said plate; and
 d) a set screw threaded through said collar for fixing the position of said post relative to said second end of said mounting bracket.

17. The assembly of claim 1 wherein said set screw includes a hex nut drive.

18. A clamp for tiltably attaching a removeable article having a convex outer portion to a fixed article, said clamp comprising:
 a) a substantially flat strip with a first end having a flat surface;
 b) a concave mid portion having a slot therethrough, wherein said concave mid-portion mates with and is fixedly attached to a convex outer portion of the removeable article;
 c) a second end having a threaded hole;
 d) a post having a bolt head end a free end, said post being threaded into said threaded hole of said second end of the clamp;
 e) a plate attached substantially perpendicularly to said free end of said post by means of a swivel;
 f) a collar threaded around said post between said second end of the clamp and said plate; and
 g) a set screw threaded through said collar for fixing the position of said post relative to said second end of the clamp.

19. The clamp of claim 18 further comprising a means adapted to fixedly attach the clamp through said slot of said concave mid-portion to the convex outer portion of the removable article.

20. The clamp of claim 18 wherein said set screw further includes a hex nut drive.

21. The clamp of claim 18 wherein said clamp is made of steel.

* * * * *